Patented Jan. 20, 1953

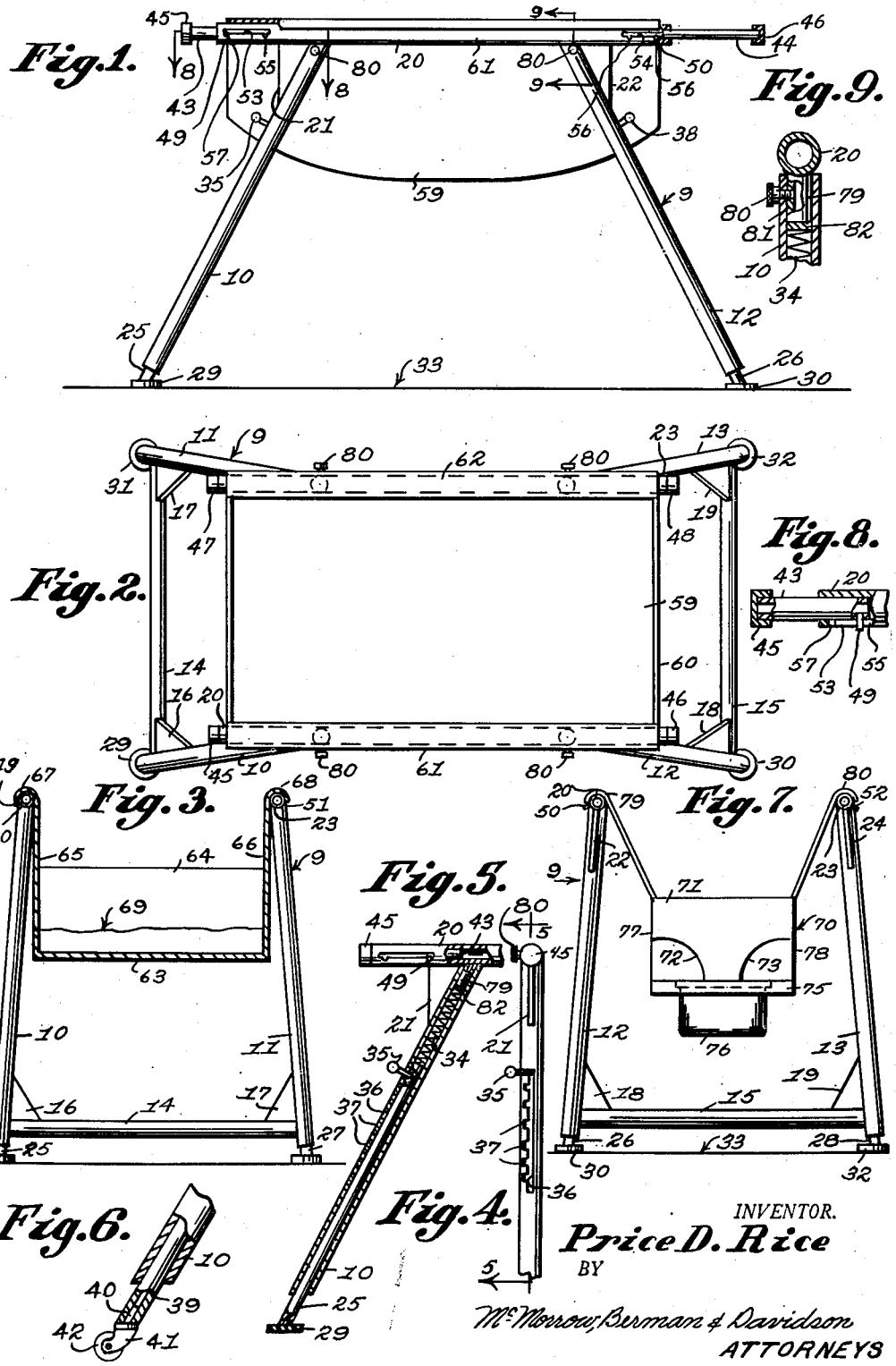

2,626,118

UNITED STATES PATENT OFFICE 2,626,118

UTILITY FRAME OR SUPPORTING UNIT

Price D. Rice, Washington, D. C.

Application April 2, 1948, Serial No. 18,655

2 Claims. (Cl. 248—163)

This invention relates to a universal utility frame or supporting unit serving as a stand for supporting any one of a series of different pieces of equipment for facilitating the handling and attending to an infant and providing comfort, rest, occupation, and even amusement for the infant.

The main object of my invention is to provide a universal frame or stand for supporting special pieces of equipment which are individually adapted to be detachably mounted thereon so that an infant may be supported upon said piece of equipment thus added to the stand.

A very important object is to provide a universal frame or unit of the character indicated which is collapsible to form a kit and thereby form a mechanical companion to the mother for facilitating attending to to the infant in different localities.

Another object is to have such a utility frame or stand which is adjustable in height and capable of being shifted from one place to another as desired.

It is also an object to have such a utility frame or unit which is provided with telescoping handles at the ends thereof for facilitating the carrying of the stand to various places and up or downstairs, etc., and otherwise manipulating the unit as may be required, and supporting long pieces of equipment.

It is even an object to have such a unit which is very simple in form, accessible and at the same time very strong so as to withstand shocks and strains and yet be entirely dependable to support the pieces of equipment intended to be mounted thereon without danger of collapse or accident.

It is, of course, an important object of my invention to make this utility frame or unit of metal, and particularly of tubular metal members secured together in a very firm structure so that it will be not only strong, but also light, and, therefore, readily handled by a woman attending to the infant supported thereon.

An ancillary object is to make such a utility frame or supporting unit of such a small number of parts and of such simple construction that it will be reasonable in cost and, therefore, encourage general distribution in the public.

Other objects and advantages of my invention will appear in further detail as the specification proceeds.

In order to facilitate the ready comprehension of the features of the invention, the latter is illustrated on the accompanying drawing forming part hereof, and in which:

Figure 1 is a side elevation of a universal utility frame or supporting unit made according to the invention and embodying the same in a practical form and illustrating a piece of equipment mounted thereon to demonstrate its use;

Figure 2 is a top or plan view of the same apparatus as shown in Figure 1;

Figure 3 is a transverse section showing the supporting unit with another piece of equipment in place thereon;

Figure 4 is a detail showing one type of adjustment used on the supporting unit for extending a leg;

Figure 5 is a fragmentary section also illustrating an adjustment detail, showing the full length of a leg;

Figure 6 is a fragmentary section of the lower end of one of the legs to show a different equipment thereof;

Figure 7 is an end elevation of the apparatus or supporting unit of Figure 1, as seen from the right, but furnished with a different type of equipment for the infant;

Figure 8 is a fragmentary section of one of the upper ends of the frame of Figure 1, showing detail;

Figure 9 is a fragmentary section of detail showing the upper attachment of a leg to the upper portion of the unit.

Throughout the views, the same reference numerals indicate the same or like parts.

In the field of child care, it has often been a problem to provide the various kinds of equipment which will facilitate care of a child, especially a small infant, and then through the growing years of this infant, so that its comforts and wants and occupation during the day wall be properly supervised and attended to. Usually, this means various pieces of different equipment which more or less clutter up the house and occupy a great deal of space and present a scene of disorder most of the time. For example, a crib will be used, and then in another place a comfort chair or commode, and then perhaps an indoor swing will stand off to one side, and, furthermore, a table may be crowded into the room as well, and so on, with various pieces of equipment varying in size and form and character, as the parents may find occasion to obtain such equipment.

Obviously, such a number of articles occupying the nursery causes extra work and perhaps many unnecessary steps on the part of the mother attending to the child, and upon occasion also invites possibility of accidents, not to mention that inconvenience will certainly characterize a place thus filled with various equipment such as mentioned, and hence, the whole aggregate has heretofore presented a problem. Considering the latter, I have found it quite feasible to solve several problems involved by introducing the universal utility frame or stand such as already indicated and as it will now be described in detail.

Hence, in the practice of my invention, and referring again to the drawing, a utility frame forming a supporting unit, generally indicated at 9, primarily includes four legs 10, 11, 12 and 13, which are secured together in pairs at the lower portions thereof by a pair of transverse members 14 and 15, the cross-member or bar 14 being further braced to legs 10 and 11 by means of triangular plates forming rigid braces at 16 and 17, while in similar fashion cross-bar 15 is braced at 18 and 19 to legs 12 and 13. The cross-bars and brace plates 16 to 19 are preferably brazed or welded together to form a rigid connection at each corner.

At their upper ends, legs 10 and 12 are attached to a horizontal longitudinal member 20 in a special detachable manner. Upon longitudinal member 20 are brazed, welded, or otherwise fixed, a pair of relatively short diverging pendent studs 79 (one shown in Figures 5 and 9), fitting slidably within the upper ends of legs 10 and 12 and the latter being detachably held in place thereon by means of manually-releasable set screws 80, 80 engageable with interior nuts 81 within the legs. In similar fashion, the upper ends of rear legs 11 and 13 are also attached to a second horizontal longitudinal member 23, and being detachable therefrom when the unit is to be taken apart. This makes it possible, when the unit is to be removed to another place, as for example, following a trip to another locality, to collapse the unit and pack it up as a portable kit capable of again being set up there.

In order to steady the legs when attached to the upper longitudinal members, triangular brace places 21, 22, 24, etc., are brazed or welded to the legs so that when the latter are in attached or assembled position, the upper edges of these brace plates engage against and support the longitudinal members.

Preferably, all the members thus far mentioned, such as the legs, the cross-bars 14 and 15 and the upper longitudinal members 20 and 23 are tubular, and, therefore, light in construction. Inasmuch as the legs are all hollow, each is provided with an extensible inner tube 25, 26, 27 or 28, as the case may be, terminating at the bottom in a flat foot disc 29, 30, 31 and 32, disposed at the proper angle to lie conformably upon the floor indicated at 33. As particularly shown in Figures 4 and 5, each leg, as in leg 10, has the inner extensible tube therein projecting a considerable distance up into the leg and urged downward by a spring 34 engaging against the upper end of said inner tube, while the latter is provided with a finger piece 35 projecting out through a longitudinal slot 36 in the leg, one side of this slot having a plurality of spaced recesses 37 into which the finger piece 35 may be shifted by partially rotating the inner tube member 25 in whatever adjustment is thereby attained. Thus, for each of the recesses 37 the individual engagement of finger piece 35 therein will provide a different degree of extension for the foot 29 beyond leg 10 and thereby cause the whole supporting unit to be raised or lowered accordingly. In similar fashion, the legs 12, and of course the rear legs 11 and 13, have finger pieces such as 35 already described and as also shown at 38 in Figure 1, and all four of the legs are, therefore, similarly extensible according to requirement of the user.

While the extensible inner tubular members 25, etc., have been described as provided with flat pedal members 29, etc., it is self-evident that such tubular member 39, shown in leg 10 in Figure 6, may have shank 40 of a caster 41 provided with a wheel 42 inserted therein, and the four legs are thus provided, and the whole frame or unit may be rolled along the floor instead of merely pushed, as would be necessary with the flat pedal members 29, 30, etc., upon the lower ends of the legs, such equipment being a matter of choice. Within the legs, springs 34 abut plugs 82.

The upper open ends of the parallel upper tubes 20 and 23 are occupied by inner tubular members 43 and 44, etc., furnished with exterior caps 45, 46, 47 and 48 of equal diameter with the tubular members 20 and 23.

Upon each of the extensible tubular members 43, 44, etc., is fixed a pin 49, 50, 51 and 52 shiftable along the longitudinal open slots 53 and 54 in tubular member 20, for example, these slots having detents or notches 55, 56 at their inner ends and corresponding side notches 56, 57 at the outer ends thereof. When the tubular members 43 and 44, etc., are to be extended, the pins 49 and 50 thereof, which normally rest in recesses or detents 55, 56 at the inner ends of slots 53 and 54, are removed from these recesses by a slight turn of caps 45 and 46, and the members pulled out until the pins strike the outer ends of the slots when a return twist of the caps will cause the pins to engage the outer cuts or recesses 57 and 58. In similar fashion, the caps 47 and 48 beyond the ends of rear upper tubular member 23 may be twisted and pulled out, the construction at the rear being, of course, similar to that already described in connection with member 20 and caps 45 and 46 upon inner tubular members 43 and 44. One purpose of the extensibility of the upper tubular members 23 and 20 is, of course, to facilitate projecting the caps 45 to 48 with the extensible inner tubular members to form handles by which to lift and carry the whole frame, but they also have a further purpose of even greater importance upon occasion, as will presently appear.

Upon the upper tubular members 20 and 23, just mentioned, may be suspended any one of a series of different types of equipment, as for example, shown in one form in Figures 1 and 2 wherein a bath or bassinet 59 made of rubber or plastic, or even fabric, has an upper bounding frame 60 at the sides of which are secured a pair of elongated arcuate hangers 61, 62 hooked over tubular members 20 and 23, thereby suspending the bassinet. Should this bassinet or some other unit of similar nature having the hangers 61, 62 be of greater length than these tubular members and perhaps of such great length that even when the extensible members 43 and 44, etc., are drawn out, they will correspond approximately in length with the extended length thus produced in the tubular members 20 and 23 with the members 43 and 44 and their caps 45, 46, 47 and 48, then the caps will assist in supporting the outer ends of the long hangers thus suspended upon the tubular members, due to the fact that the caps are of the same diameter as the latter members.

In Figure 3, a transverse section of a bed is shown at 63, one end 64 of which is also illustrated as well as the sides 65 and 66, which at their upper ends are bent at 67 and 68 to form the hangers required to suspend the same from members 20 and 23. This bed may be of sheet metal if desired, or any other suitable material, and may naturally be furnished with a mattress or the like indicated at 69.

As shown in Figure 7, a training chair or commode, generally indicated at 70, has the front thereof 71 provided with a pair of apertures 72, 73 to accommodate the legs of the infant sitting upon seat 74, while a vessel 76 is furnished in the seat. From the upper sides 77 and 78 extend the hangers 79, 80 which hook over tubular members 20 and 23 in similar manner as already explained in connection with the hangers of bed 63 and bassinet 59. In a similar manner, a table or feeding tray, dressing or play table, a training seat, or indoor swing may be suspended upon the upper parallel members 20 and 23, whether of greater or shorter length and whether or not each hanger is single or divided into two or more on each side.

As shown in the drawing, the four legs 10 to 13 diverge outwardly toward the bottom in order to make the structure steady and proof against tipping in any direction, and due to the fact that the structure is open at the ends upwardly, ready access is had to any piece of equipment mounted upon the upper members, and any length within reasonable limits of such equipment will be accommodated on the supporting unit or frame.

From the foregoing it is seen that the entire supporting frame or unit with all its adjustable or extensible members is capable of being collapsed into a portable kit which may be transported to another locality, such as a park, playground, seashore or any other place, such as the house of friends and relatives and there set up for use.

Manifestly, variations may be resorted to and parts and features may be modified or used without others within the scope of the appended claims.

Having now fully described my invention, I claim:

1. In a collapsible utility frame for suspendingly supporting infant attending equipment, a first pair of spaced hollow legs, brace means arranged transversely of said first pair of legs and fixedly secured thereto, a second pair of spaced hollow legs arranged in spaced aligned relation with respect to said first-named legs, brace means arranged transversely of said second-named pair of legs and fixedly secured thereto, said pairs of legs being arranged in convergent relation with respect to each other and each having their ends remote from the convergent ends resting on a supporting surface, a triangular brace plate projecting from each leg adjacent the convergent end thereof, a first horizontally disposed hollow member extending from one leg of said first pair to the aligned leg of said second pair adjacent the convergent ends thereof and resting on the triangular brace plates of said convergent ends, a second horizontally disposed hollow member extending from the other leg of said first pair to the other leg of said second pair adjacent the convergent ends thereof and resting on the triangular brace plates of said convergent ends, and lug means depending from each of said horizontally disposed members and slidably receivable in the convergent end of each of said legs to thereby hold said legs and said hollow members in assembled relation with respect to each other.

2. In a collapsible utility frame for suspendingly supporting infant attending equipment, a first pair of spaced hollow legs, brace means arranged transversely of said first pair of legs and fixedly secured thereto, a second pair of spaced hollow legs arranged in spaced aligned relation with respect to said first-named legs, brace means arranged transversely of said second named pairs of legs and fixedly secured thereto, said pairs of legs being arranged in convergent relation with respect to each other and each having their ends remote from the convergent ends resting on a supporting surface, a triangular brace plate projecting from each leg adjacent the convergent end thereof, a first horizontally disposed hollow member extending from one leg of said first pair to the aligned leg of said second pair adjacent the convergent ends thereof and resting on the triangular brace plates of said convergent ends, a second horizontally disposed hollow member extending from the other leg of said first pair to the other leg of said second pair adjacent the convergent ends thereof and resting on the triangular brace plates of said convergent ends, lug means depending from each of said horizontally disposed members and slidably receivable in the convergent end of each of said legs to thereby hold said legs and said hollow members in assembled relation with respect to each other, an inner tube slidably supported within the end of each of said legs adjacent said supporting surface and mounted in the latter for extensile and retractile movement to raise and lower said frame with respect to said supporting surface, resilient means carried within said legs and operatively connected to said inner tubes for biasing the latter into their position of extensile movement, and hand actuable means carried by said inner tubes and engageable with said legs for positioning said tubes in select positions of their retractile movement.

PRICE D. RICE.

REFERENCES CITED

The following references are of record in the file of this patent:

UNITED STATES PATENTS

| Number | Name | Date |
| --- | --- | --- |
| 456,990 | Hawley | Aug. 4, 1891 |
| 589,056 | White | Aug. 31, 1897 |
| 1,166,865 | Stone | Jan. 4, 1916 |
| 1,519,506 | Powers | Dec. 16, 1924 |
| 1,590,228 | Caldwell | June 29, 1926 |
| 1,600,835 | Manley | Sept. 21, 1926 |
| 2,072,791 | Baer | Mar. 2, 1937 |
| 2,157,112 | Bonner | May 9, 1939 |